US007725740B2

United States Patent
Kudelski et al.

(10) Patent No.: US 7,725,740 B2
(45) Date of Patent: May 25, 2010

(54) GENERATING A ROOT KEY FOR DECRYPTION OF A TRANSMISSION KEY ALLOWING SECURE COMMUNICATIONS

(75) Inventors: Henri Kudelski, Grandvaux (CH); Serge Gaumain, Yverdon (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 1022 days.

(21) Appl. No.: 10/848,014

(22) Filed: May 19, 2004

(65) Prior Publication Data

US 2004/0236959 A1  Nov. 25, 2004

(30) Foreign Application Priority Data

May 28, 2003  (CH)  ..................... 0953/03

(51) Int. Cl.
*G06F 11/30*  (2006.01)
*G06F 12/14*  (2006.01)

(52) U.S. Cl. .............. 713/194; 726/4; 380/44
(58) Field of Classification Search ......... 713/194; 726/9; 380/44
See application file for complete search history.

(56) References Cited

U.S. PATENT DOCUMENTS

| | | | |
|---|---|---|---|
| 4,786,790 A | | 11/1988 | Kruse et al. |
| 5,067,156 A | | 11/1991 | Martin |
| 5,177,790 A | * | 1/1993 | Hazard .................. 380/28 |
| 5,191,608 A | | 3/1993 | Geronimi |
| 5,201,000 A | * | 4/1993 | Matyas et al. .............. 380/30 |
| 5,774,058 A | * | 6/1998 | Henry et al. .............. 340/5.5 |
| 5,944,821 A | | 8/1999 | Angelo |
| 6,141,756 A | * | 10/2000 | Bright et al. ............... 726/22 |
| 6,327,652 B1 | * | 12/2001 | England et al. ............ 713/2 |
| 6,415,371 B1 | * | 7/2002 | Nakamura et al. .......... 711/164 |
| 6,625,729 B1 | * | 9/2003 | Angelo et al. ............. 713/2 |
| 6,684,326 B1 | * | 1/2004 | Cromer et al. ............. 713/2 |
| 6,907,522 B2 | * | 6/2005 | Morais et al. ............. 713/2 |
| 6,920,566 B2 | * | 7/2005 | Lewis ................... 713/194 |
| 6,938,164 B1 | * | 8/2005 | England et al. ........... 713/193 |
| 6,986,052 B1 | * | 1/2006 | Mittal ................. 713/190 |
| 7,013,384 B2 | * | 3/2006 | Challener et al. ......... 713/2 |
| 7,036,023 B2 | * | 4/2006 | Fries et al. ............. 726/21 |
| 7,069,442 B2 | * | 6/2006 | Sutton et al. ........... 713/179 |

(Continued)

FOREIGN PATENT DOCUMENTS

EP  0 280 035 B1  8/1988

(Continued)

*Primary Examiner*—Edan Orgad
*Assistant Examiner*—James Turchen
(74) *Attorney, Agent, or Firm*—Harness, Dickey & Pierce, P.L.C.

(57) ABSTRACT

A method is used to restore the security of a secure assembly such as a chip card, after the contents of its second memory zone have been read by a third party. The method is for generating a security key implemented by a secure module comprising a central unit, a first conditional access memory zone and at least one second memory zone containing all or part of the user program. The method includes reading of all or part of the second memory zone, and generation of at least one root key based on all or part of the second zone data and on at least one item of secret information stored in the first memory zone.

12 Claims, 1 Drawing Sheet

U.S. PATENT DOCUMENTS

| | | | |
|---|---|---|---|
| 7,069,445 B2 * | 6/2006 | Cheston et al. | 713/187 |
| 7,117,376 B2 * | 10/2006 | Grawrock | 380/277 |
| 2002/0087877 A1 * | 7/2002 | Grawrock | 713/200 |

FOREIGN PATENT DOCUMENTS

| | | |
|---|---|---|
| EP | 0 434 551 B1 | 6/1991 |
| EP | 0 475 837 B1 | 3/1992 |
| FR | 2 829 645 | 3/2003 |
| WO | WO 01/86601 A1 | 11/2001 |

* cited by examiner

GENERATING A ROOT KEY FOR DECRYPTION OF A TRANSMISSION KEY ALLOWING SECURE COMMUNICATIONS

The present application hereby claims priority under 35 U.S.C. §119 on Swiss patent application number CH 0953/03 filed May 28, 2003, the entire contents of which are hereby incorporated herein by reference.

FIELD OF THE INVENTION

This invention generally concerns the domain of security modules, preferably those including at least one central unit and two memory areas.

BACKGROUND OF THE INVENTION

Units are used in operations implementing cryptographic systems and are given in monolithic form. They are either produced on the same silicon chip or they are assembled on a support and embedded in a resin or protected by a sheet covering the different elements and acting as a fuse in the case of an attempted intrusion.

These security processors have a first memory zone called a bootstrap that is executed during the activation of the processor or at each resetting to zero. This memory is of the ROM type, namely that it is Read Only Memory.

During the execution of the start-up program, this program verifies the second memory zone that is of the rewritable type, usually of the EEPROM, NVRAM or Flash type. This verification is important as it serves to ensure that the data in this second zone is valid, namely that it is definitely a program (at least in part). This verification can be carried out in various ways such as the calculation of an imprint (CRC, Hash) and the comparison of this imprint with a value stored in the same zone.

Once the master program that has been initially started completes its verification, it connects with the second zone and begins the execution of the user program at a conventional address.

The particularity of this type of processor is that at the time of the execution of the program in the second zone, it does not have free access to the memory of the first zone. This access is either definitively prohibited or is subject to a verification mechanism (password for example).

This offers important security because the verification means, as well as the start-up data, are not accessible to the user program. All the data contained in the first zone is thus protected from any intrusion.

It is possible that this first bootstrap zone, in addition to having a part in read-only memory (ROM), includes a rewritable part of memory that is subjected to the same security conditions.

When the first zone is of a very limited size, the execution of the verification program can be carried out from the second zone. The latter is divided into a verification part and a user part.

Therefore, the verification of the user program is carried out on the basis of the data of the first zone. Namely, it is carried out on the basis of a first key that is generally stored in the first zone and which allows the verification of the data imprint of the second zone.

The second zone contains data constituting the program and a signature that is encrypted by this first key.

The verification program that can either be in the first zone, or in a verification part of the second zone, calculates a unique imprint (Hash, CRC) on the data to be verified.

To verify that the data is correctly validated, the second zone contains the imprint encrypted by a key that is initially stored in the first zone. This key is used to decrypt the encrypted imprint and the result obtained is compared with the calculated imprint.

This key can be in the first zone either in a definitive form (ROM) or in the programmed form (EEPROM or Flash for example). In this second case, programming is carried out in a machine or in an authorized centre for example. The program of the first zone accepts this program as long as no other key is already found in this memory location.

This key can be of the symmetrical type and thus secret or it can be of the asymmetrical type. In this second variant, this key can be found in a memory zone other than the first zone because even if a third party discovered this key, the third party would not be able to identify a modified data set because he must have the corresponding private key to identify the data. Obviously, this key is not issued from the management centre that is responsible for preparing the updating of the data.

The data of the second memory zone can represent either one or several programs, either important data such as rights or decryption keys, or a combination of both.

One of the known types of attacks used to discover the contents of the second zone is to search a security defect such as a memory overflow that allows control to be taken of the processor. Once control has successfully been taken, a third party transfers the contents of the second zone towards the exterior and is able to analyse the security mechanism and the keys used.

Using the knowledge of the contents of the second memory zone, the third party has the keys serving to manage the different rights and access to services that control this processor.

Therefore, if a change of keys takes place, managed by the management centre, this change command will be encrypted by a key present in the second memory zone. The third party, who has knowledge of this key, can decrypt this message and also update the contents of this new key.

Therefore, it is apparent that while a secure mechanism has been used to verify the contents of the program zone (second zone), once security has been violated, none of the changes initiated by the management centre have an effect on security because the changing means (new transmission key for example) use keys that the third party already has in his possession. He can thus decipher the updating message and also change its transmission key. The breach cannot be stopped even if the security breach has been corrected in the application.

SUMMARY OF THE INVENTION

An object of an embodiment of this invention is to propose a method to restore the security of this type of security assembly once the contents of the second memory zone have been read by a third party.

This aim may be achieved using a method for generating a security key carried out by a security module including a central unit, a first conditional access memory zone and at least one second memory zone containing all or part of the user program, wherein it includes the following steps:

reading all or part of the second memory zone, generation of at least one root key based on all or part of the data of the second zone and on at least some secret information stored in the first memory zone.

Therefore, thanks to the generation of this new root key, it will be possible to secure the replacement of the transmission key and in the same way, of all the keys transmitted subsequently.

It is important that this root key is never constant and must for that reason be different from any key stored in the first memory zone such as the factory key. For this reason the root key is generated as a variable using the new data transmitted by the management centre.

In a first version, this new key is generated without the data of the second zone necessarily being verified. If this data has been modified, the root key will simply be false and the future decryption of a transmission key with this key will not give the correct result.

This root key thus depends on one hand on the downloading or contents of the second memory (or data) and on the other hand on a key stored in a location inaccessible to a third party.

According to another embodiment, the factory key is replaced by a secret program stored in the first zone that calculates, according to a secret algorithm, an imprint on all or part of the second zone data. The manipulation of the data (combination, multiplication, division, EXOR etc.) of the second zone according to a particular algorithm allows the root key to be determined.

BRIEF DESCRIPTION OF THE DRAWINGS

The invention will be better understood thanks to the following detailed description and which refers to the enclosed drawings that are given as a non-limitative example, namely.

DETAILED DESCRIPTION OF THE PREFERRED EMBODIMENTS

Figure 1:
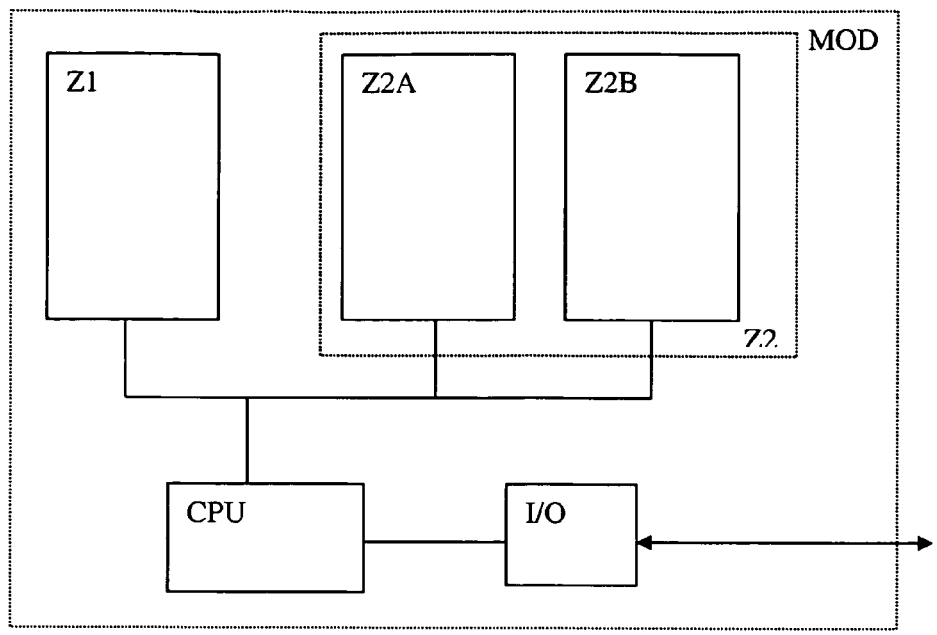
FIG. 1 describes the organization of a secure processor set.

In FIG. 1, the module MOD is a secure processor module. For this reason, it disposes of at least two memory areas namely the first zone Z1 and the second zone Z2. The first zone is made up of all or part ROM memory and is thus not rewritable. It is possible for a part to comprise of memories in RAM or EEPROM for variables among other things. This is called conditional access due to the fact that it is not freely accessible, in particular during the execution of a program in the second zone.

The second zone Z2 contains the processing program and the data. This zone is made up of a non-volatile memory but with the possibility of writing such the EEPROM. Zone Z2 can also contain a volatile memory such as the RAM. In fact, this zone is not generally homogeneous and can comprise several memories of the ROM, RAM, EEPROM, NVRAM and FLASH type.

In our example, a first part of zone 2 called a work zone Z2A is taken into consideration that serves to carry out operations related to the generation of the root key.

User area Z2B is a schematic view of the part containing the processing program(s). According to the implementation method, it is possible to include variables such as security keys for example.

The processor CPU is automatically managed in the first zone Z1 during implementation or resetting. It is at this point that the first security operations are carried out.

These operations use the first memory zone, but also the work zone Z2A if necessary. Due to the limited area of the first zone, messages are sent to the work zone to carry out the calculation of the imprint for example. The routine that allows the calculation of this imprint can be found in the second zone. Nothing impedes this routine forming part of the data that will be verified. This program is called the system program The initialisation program launched at the start, calculates an imprint on the conventional part of the data to be verified. This part is defined by pointers contained in the second memory zone. An illustration of the portion mechanism of the user zone Z2B is contained in FIG. 2.

The taking into account of data forming the imprint can be made on all or on a part of the user zone. In practice, this imprint will preferably be calculated on the program part and not on the data part (visualization rights for example) since the latter are susceptible to modification during the use of the user program. The identification program of the imprint initialised at the start, calculates the imprint on the conventional part of the data to be verified. This part is defined by pointers contained in the second memory zone, in particular in the portion DES in FIG. 2.

Within the scope of the invention, this imprint is carried out by a unidirectional operation which is a mathematical application H of a source set towards a destination object, in which each element x of the source set is attributed with an image H(x). These functions are particularly useful when they are functions of the Hash type, such as that which is defined in page 27 of the work *RSA Laboratories' Frequently Asked Questions About Today's s Cryptography*, v4.0. Element x can be of any length but H(x) is always a fixed length of characters, namely a fixed-size string. This type of function is difficult to invert, that is to say that the knowledge of H(x) does not in general allow the discovery of x. Furthermore, it is collision free when it is injective, that is to say that H(y)=H(x) necessarily leads to y=x, similarly H(y)_H(x) necessarily leads to y_x.

It is considered impossible to reproduce the same control information H as soon as a single value of the set x has been modified even if other values are modified with the aim of invalidating the modification generated by the first modification.

Figure 2:
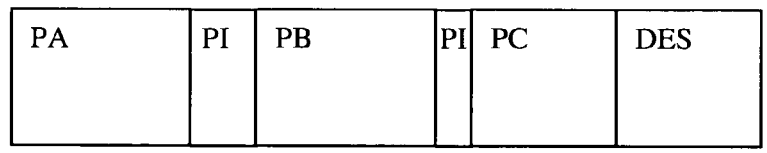
FIG. 2 shows a division of the second zone.

In FIG. 2, the user zone Z2B in FIG. 1 is divided into several portions PA, PB and PC. These portions are not adjacent in this example and are separated by portions PI that do not affect the calculation of the imprint. The information describing these different portions is contained in portion DES that also forms part of the user zone Z2B. It contains the indications of memory locations involved in the calculation of the control information. These indications can be either in the form of a "start pointer" and "length" or "start pointer" and "end pointer".

Furthermore, it is possible to have not just one but several items of control information, each item of information H1, H2, Hn is applied on a portion PA, PB or PC. This allows the generation of not only one root key but several keys.

In FIG. 1 the I/O block illustrates the form of communication towards the exterior of the module MOD, method(s)/device(s) for using the cryptographic functions and the rights stored in the memory Z2B. It is also in this way that the data is accidentally extracted from the zone Z2 by a defect such as that described previously.

Figure 3:
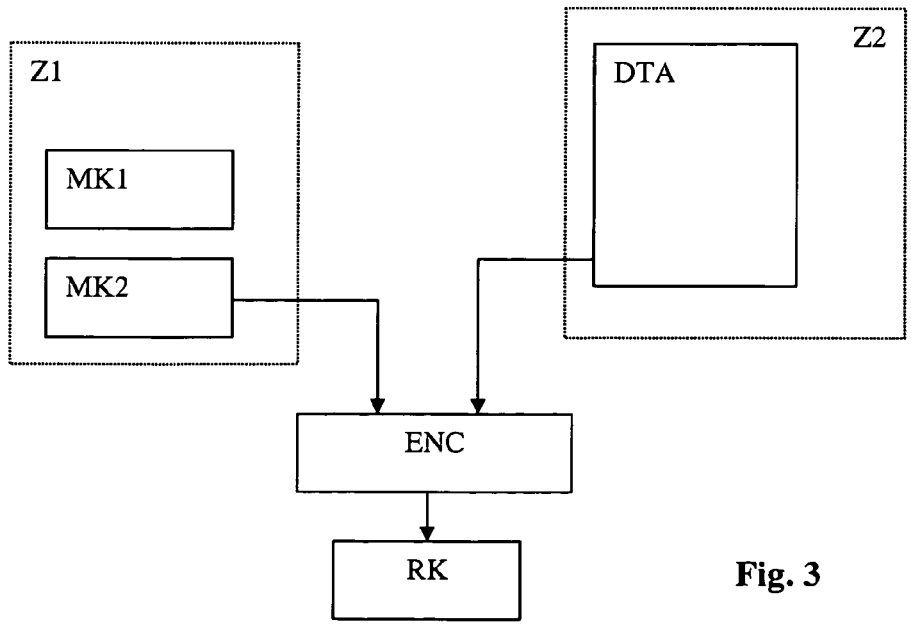
FIG. 3 describes the mechanism for generating the root key.

In FIG. 3, the generation of the root key is schematized. The data DTA that, according to the example in FIG. 2, is made up of portions PA, PB and PC, serves to calculate with the processor the imprint that is in our case control information Hash. To calculate the root key RK, this control information H and a factory key MK2 are used to obtain the root key RK by the intermediary of an encryption module ENC. This secret key will be of the symmetrical type (or used symmetrically by the managing centre) since in the contrary case it would not be the same resultant root key in the managing centre and in the module MOD.

It should be noted that if the contents of the user part Z2B already have an established imprint when the conformity of the program stored is verified, it is possible to use the imprint in place of the control information H. The important factor in this operation is the use of data that represents all or part of the data DTA. In a variant, it is possible to select one from three octets, for example, to identify the data that will be encrypted by the factory key MK2.

According to another embodiment, the factory key is replaced by a secret algorithm (RTN) that is stored in the first zone Z1. The algorithm can be copied from this first zone towards the work zone Z2A during the initialisation phase if necessary.

According to a particular method this algorithm combines all or part of the data DTA in order to obtain a unique result depending on the data. This combination can implement different arithmetical operations such as multiplication, Exor etc.

Once this root key has been calculated, it is stored in a memory zone of the second zone Z2.

The location of the execution of these method steps is not identified. The program in the bootstrap zone can simply copy the factory key in a temporary memory zone and the root key generation program, called the system program, can be contained in the work zone Z2A. The important factor is the storage of this factory key in the first zone Z1 in order to render it inaccessible during the normal execution of the user program.

Once the root key has been generated, the factory key is eliminated from the temporary memory.

According to one of the practical applications, the management centre that is responsible for security, prepares new software in order to avoid a known defect such as an attack by a counterfeiter aiming to extract the data of the zone Z2. This new software is signed, that is to say that the Hash function is calculated on the data and the result is encrypted with the private key MK1.

All is then encrypted by transmission keys and transmitted in the form of messages to security modules MOD.

The program existing in the user zone Z2B processes the incoming data and decrypts the messages by way of one or several system transmission keys. The data is then stored in locations provided for that purpose. Once this downloading has been completed the processor activates a re-start function. This allows all the newly stored data to be verified.

This verification in general refers to the set of stored programs and the verification is carried out according to the steps described above. If the hypothesis of a third party with an insecure module MOD is considered, the first memory zone Z1 does not exist (or is blank) and the processor immediately starts in the second zone Z2. The new program received from the management centre is decrypted by the third party and the user zone is therefore identical to that of a secure processor with double memory zones.

During the start-up of the secure processor, the root key is generated and is used to decrypt the new transmission key. The fictitious module does not have this root key and cannot decrypt the transmission key. At this point, the messages exchanged between the management centre and the security module are no longer accessible to the fictitious module. If the latter attempts to rediscover the root key by way of an attack of the type that would allow it to obtain the contents of the second zone, this attack would no longer work since the aim of this new software is precisely to avoid this type of fraud. The secure module rediscovers the security level preceding the attack that had allowed the data extraction.

Therefore, this method allows a security defect to be rectified remotely and the original security to be reset without having to exchange all the modules as was often the case.

As indicated above, access to the first zone Z1 is carried out at the start-up of the microprocessor or after a verification mechanism. During the scenario described above, it is possible not to activate the resetting of the microprocessor and request access to the first zone by means of a gateway. Once the entrance has taken place by way of this requested gateway (by the introduction of a password for example), the execution of the program is no longer visible since the second zone is thus unknown to a third party having recopied this zone. The program initiated in this way starts the generation of the root key.

The conditional access memory zone Z1 cannot supply the necessary secret data to form the root key. In this configuration, the program of the user zone Z2, only has access to the first zone Z1 to read the data for the calculation of the root key. During these operations, the visibility duration of the first zone will be limited to the time necessary for reading, this zone will then be made inaccessible.

According to one embodiment, the factory key makes a set of keys. At each generation of a root key, a factory key is deactivated. The selection of the key to be used can be carried out in different ways, namely:

on the command of the management centre, that is to say by a descriptor in the definition data DES, by using the n last bits of the imprint (for example 3 bits) that allows the bits to choose from among the keys (for example 8 keys) stored.

A storage medium is adapted to store information of any of the aforementioned programs and is adapted to interact with a data processing facility (such as a computer or computer device) to perform the method of any of the above mentioned embodiments. The storage medium can be offered to the user in the form of a computer-readable storage medium. The storage medium may be a built-in medium installed inside a computer main body or removable medium arranged so that it can be separated from the computer main body. Examples of the built-in medium include, but are not limited to, rewriteable involatile memories, such as ROMs and flash memories, and hard disks. Examples of the removable medium include, but are not limited to, optical storage media such as CD-ROMs and DVDs; magneto-optical storage media, such as MOs; magnetism storage media, such as floppy disks (trademark), cassette tapes, and removable hard disks; media with a built-in rewriteable involatile memory, such as memory cards; and media with a built-in ROM, such as ROM cassettes.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. Method for generating a root key implemented by a secure module comprising a central unit, a first conditional access memory zone containing all or part of a bootstrap program and at least one second memory zone containing a first portion and a second portion containing all or part of a user program, the method comprising:

executing an initialisation program from the first conditional access memory zone;

reading and temporarily storing a secret information from the first conditional access memory zone into the first portion of second memory zone during the initialisation of the secure module;

reading all or part of the second portion of the second memory zone;

generating the root key based on an imprint of data of the second portion of the second memory zone and on the stored secret information, the imprint being generated based on the application of a unidirectional function to all or part of the data of the second portion of the second memory zone;

eliminating the secret information from the first portion of the second memory zone after the root key has been generated;

disabling access to the first conditional access memory zone, wherein at the time of execution by the central unit in the second memory zone, no access is granted to the first conditional access memory zone wherein the root key is used to allow decryption of transmission key, the transmission key allowing secure communication between the secure module and a management center.

2. Method according to claim 1, wherein the secret information is a factory key.

3. Method according to claim 1, wherein the secret information is an algorithm describing the use of data to generate the root key.

4. Method according to claim 1, wherein the method further includes calculating at least one item of control information representative of all or part of the data of the second memory zone, this control information being used for the generation of the root key.

5. Method according to claim 4, wherein the control information is calculated based on a function (Hash) called unidirectional and without collision, executed on all or part of the data of the second memory zone.

6. Method according to claim 1, wherein the second memory zone further includes a description part including a location of one or more portions of the second memory zone, where the portions of the second memory zone are used in calculating control information.

7. Method according to claim 6, wherein this description part includes a plurality of location information for each part of a user memory zone corresponding to partial control information.

8. Method according to claim 2, wherein the factory key is of a symmetrical type.

9. Method according to claim 1, wherein the second memory zone includes a verification zone and a user zone, programs contained in the verification zone being in charge of the verification of the data in a user zone, the program system of the first zone transferring the necessary data from this first zone towards the verification zone.

10. Method according to claim 9, wherein the secret information is a factory key copied from the first conditional access memory zone towards the verification zone by a system program.

11. Method according to claim 10, wherein the factory key is eliminated when the root key is generated.

12. Method according to claim 1, wherein the root key is used as a transmission key to decrypt messages originating from a management centre.

* * * * *